UNITED STATES PATENT OFFICE.

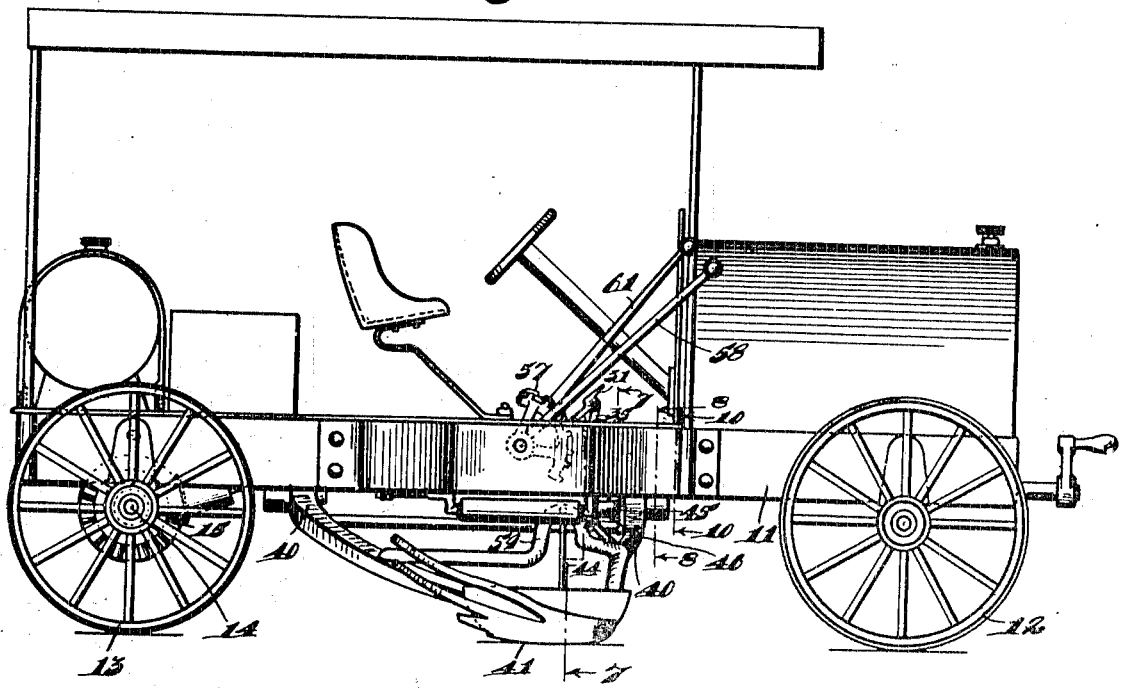

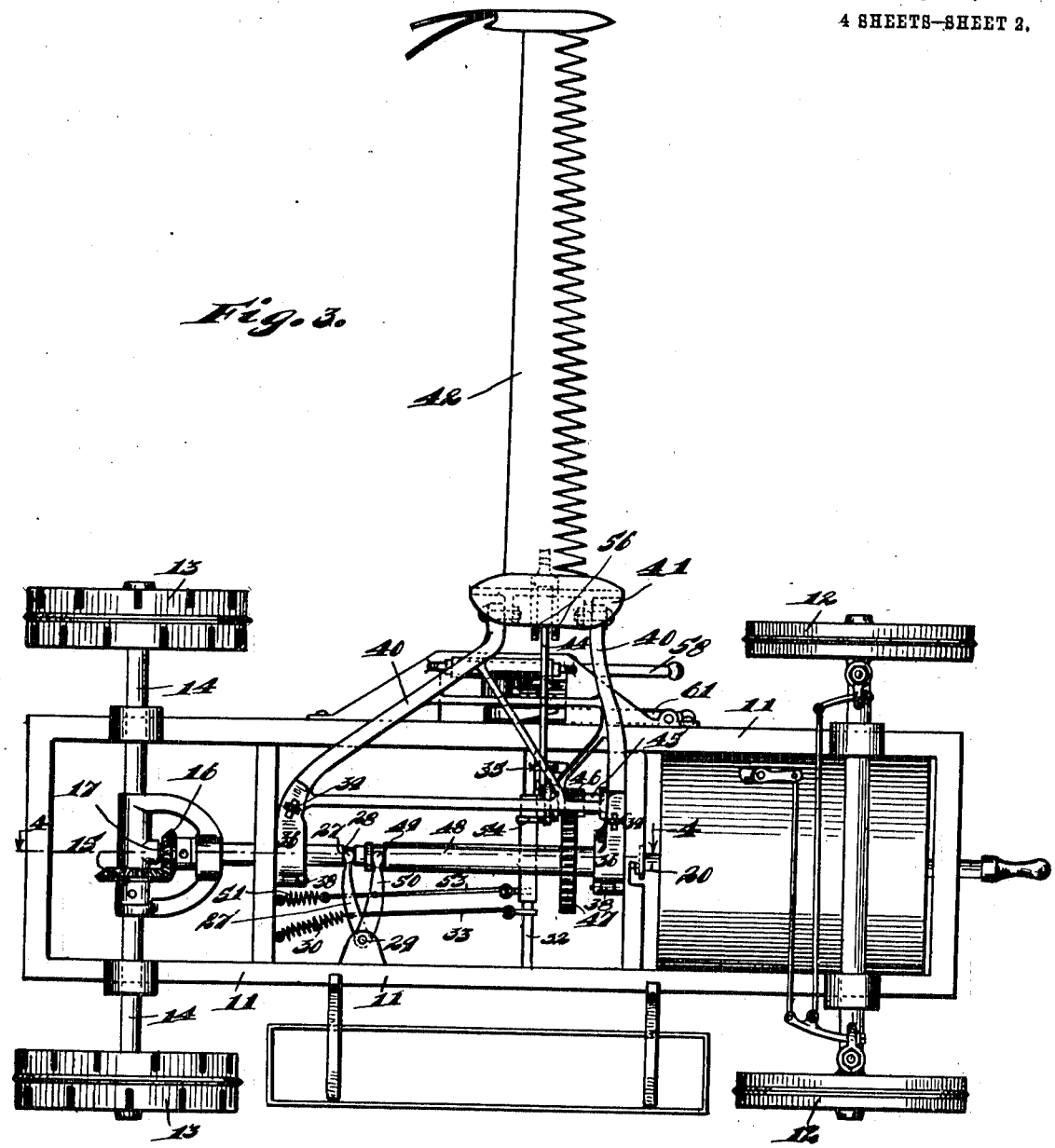

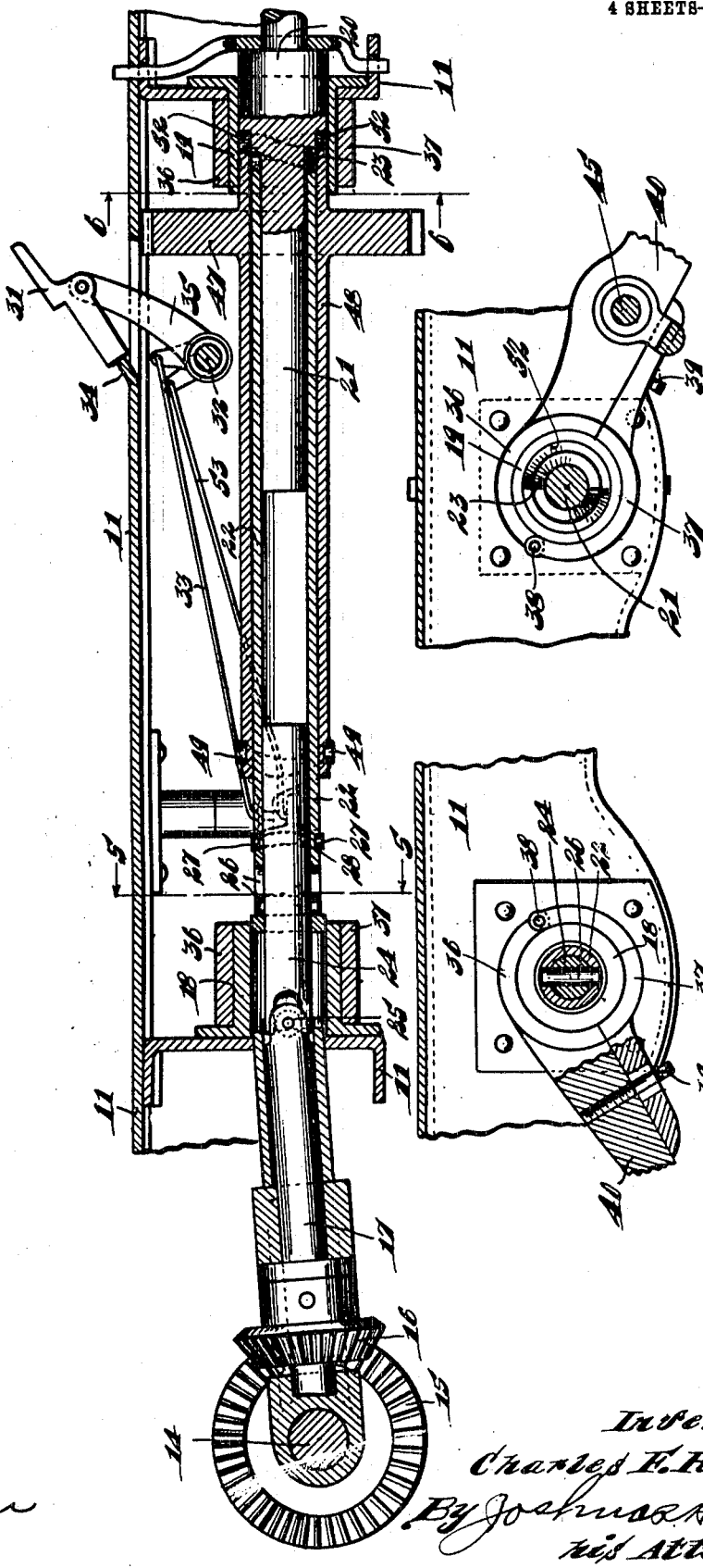

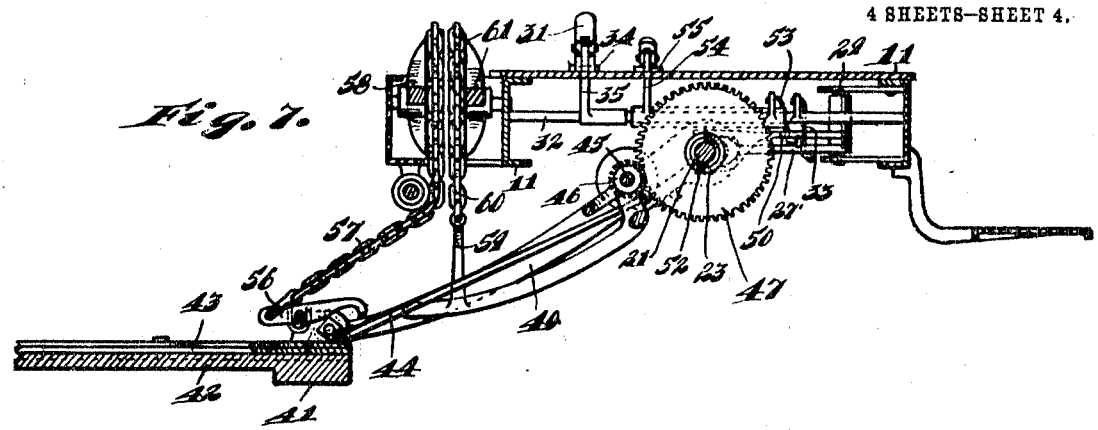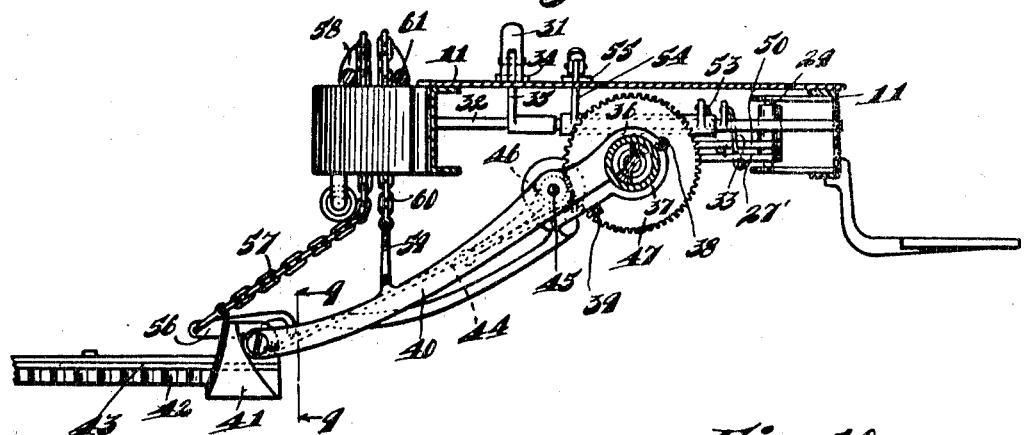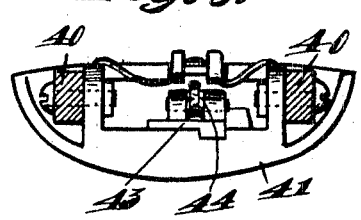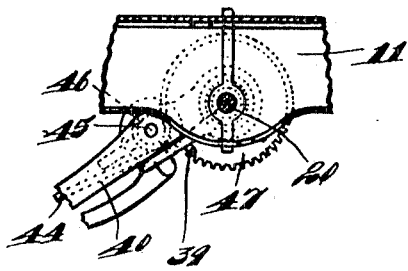

CHARLES F. RADATZ, OF KENOSHA HEIGHTS, WISCONSIN.

TRACTION-HARVESTER.

1,096,562.  Specification of Letters Patent. Patented May 12, 1914.

Application filed August 6, 1913. Serial No. 783,272.

*To all whom it may concern:*

Be it known that I, CHARLES F. RADATZ, a citizen of the United States, and a resident of the city of Kenosha Heights, county of Kenosha, and State of Wisconsin, have invented certain new and useful Improvements in Traction-Harvesters, of which the following is a specification.

My invention relates to motor tractor harvesting machines and the object of this improvement is to provide a motor driven vehicle provided with a harvester attachment which is adapted to be operated by the motor of said vehicle.

A further object is to provide a simple and effective machine of the character described.

Other objects will appear hereinafter.

With these objects in view the invention consists in the combinations and arrangements of parts hereinafter described and claimed.

The invention will be best understood by reference to the accompanying drawings forming a part of this specification, and in which, Figure 1 is a side elevation of a motor tractor equipped with an attachment embodying my invention, Fig. 2 is a perspective view of the same, Fig. 3 is a bottom plan view of the same, Fig. 4 is an enlarged longitudinal section taken on line 4—4 of Fig. 3, Fig. 5 is an enlarged section taken on line 5—5 in Fig. 4, Fig. 6 is an enlarged section taken on line 6—6 in Fig. 4, Fig. 7 is an enlarged section taken on line 7—7 in Fig. 1, Fig. 8 is a similar view taken on line 8—8 in Fig. 1, Fig. 9 is an enlarged section taken on line 9—9 in Fig. 8, and Fig. 10 is an enlarged section taken on line 10—10 in Fig. 1.

The preferred form of construction as illustrated in the accompanying drawings comprises a motor tractor provided with a harvester attachment adapted for mowing. The motor tractor comprises a frame 11 mounted on forward ground wheels 12 and rear traction wheels 13. The traction wheels 13 are mounted on an axle 14 provided with a bevel gear 15. The bevel gear 15 meshes with a bevel gear 16 which is carried on a shaft 17 journaled in the frame 11.

Hollow bearings 18 and 19 are carried by frame 11. Journaled in bearing 19 is the rearward extending end of the motor driven shaft 20. The motor driven shaft 20 is provided with a restricted end 21. Mounted on the end 21 is a hollow shaft 22 and provided with a clutch 23, of ordinary construction preferably of the toothed clutch type, the shaft 22 being slidably mounted on the end 21 to effect engagement and disengagement of clutch members 23. The rear end of the shaft 22 is mounted on a shaft 24 and the shaft 24 connected by means of a universal joint 25 with the shaft 17. A slot and pin connection 26 is provided between the hollow shaft 22 and the shaft 24 to cause simultaneous rotation thereof.

The bifurcated end 27 of lever 27' engages a groove 28 in the hollow shaft 22 and said lever is pivoted at 29 to the frame 11. A spring 30 normally maintains the lever 27' and hollow shaft 22 in a position to effect disengagement of clutch members 23. A foot pedal 31 is provided in frame 11 and mounted on a rod 32 carried in said frame. The foot pedal 31 is connected by means of a connecting link 33 with the lever 27 to effect engagement of clutch members 23 as will be readily understood. A catch 34 is formed on the floor of frame 11 adapted to engage the rear end of pedal 31 to lock the pedal arm 35 in a position to maintain the clutch members 23 in engagement by means of their connecting mechanism. From this construction it will be seen that an operator may by engaging or disengaging clutch 23 by means of foot pedal 31 cause the motor tractor to be moved by its own power.

On the outside of bearings 18 and 19 are mounted clips each composed of members 36 and 37, each member 37 being hinged to member 36 as at 38. A screw 39 is threaded in member 36 and passed through member 37 to releasably lock the members 36 and 37 in annular form around the bearings 18 and 19. A casting 40 is carried by the members 36 and extends outwardly under the frame 11 substantially as indicated. On the outer end of the casting 40 is pivoted a shoe 41 carrying a conventional cutter bar 42. Reciprocally mounted in the cutter bar 42 is a conventional sickle 43. The cutter bar construction being of any well known or preferred type. The sickle 43 is connected by means of a pitman rod 44 to a crank shaft 45 journaled in the casting 40. The shaft 45 also carries a spur gear 46 meshing with a larger spur gear 47. The spur gear 47 is carried by a sleeve 48 rotatively mounted on the hollow shaft 22. The sleeve 48 is provided with a slot at its rearward end engaged by the bifurcated ends 49 of a lever 50. The lever 50 is pivoted on the pin 29 of frame 11 and provided with a spring 51 resiliently maintaining the lever 50 and sleeve 48 at its rearward terminal of movement. The other end of sleeve 48 is provided with clutch members 52 engaging the corresponding clutch members on the motor driven shaft 20. The spring 51 normally maintains the clutch members 52 out of engagement, as will be readily understood.

The lever 50 is connected by means of a connecting rod 53 to a pedal arm 54 carried on shaft 32. The pedal arm extends through the floor of frame 11 and provides a means for manually operating the clutch members 52. The pedal arm is provided with a pedal adapted to engage a stop 55 to normally maintain the clutch teeth 52 in engagement. This construction provides a means for manually engaging and disengaging clutch members 52 thereby effecting operation and inoperation of the harvester attachment. The harvester attachment is thrown into and out of operative condition independently of the mechanism throwing the tractor in and out of self propelling condition.

Pivotally mounted on the shoe 41 is a lever 56 one end of which is provided with a hook adapted to engage the pivotal connection between the sickle 43 and pitman rod 44 to limit the movement of the sickle 43 from the cutter bar 42 when the latter is in vertical condition. The other end of lever 56 is connected by means of a chain 57 to a hand operable lever 58 by means of which the cutter bar 42 is swung on its pivotal point from horizontal to vertical condition. An eye 59 is carried by the casting 40 and connected by means of chain 60 to a hand operable lever 61 by means of which the cutter bar is raised horizontally from the ground. The operation of hand levers 58 and 61 on the cutter bar are similar to their ordinary functions in conventional harvesting machines.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the kind described, the combination of a wheeled frame; a motor driven shaft mounted in said frame; hollow bearings carried by said frame concentrically around said motor driven shaft; a harvester attachment journaled on said bearings; and an operative connection between said shaft and said harvester attachment, substantially as described.

2. In a device of the kind described, the combination of a wheeled frame; a motor driven shaft mounted in said frame; hollow bearings carried by said frame concentrically around said motor driven shaft; an arm journaled on said bearings; and a cutter bar carried by said arm, substantially as described.

3. In a device of the kind described, the combination of a wheeled frame; a motor driven shaft mounted in said frame; hollow bearings carried by said frame concentrically around said shaft; a pair of semi-circular members rotatively mounted on each of said bearings, the members of each pair thereof being hinged together at two of their adjacent ends and removably secured together at their other ends; and a harvester attachment carried by said semi-circular members, substantially as described.

4. In a device of the kind described, the combination of a wheeled frame; a motor driven shaft mounted in said frame; hollow bearings carried by said frame concentrically around said motor driven shaft; a pair of semi-circular members journaled on each of said bearings, each pair of members being hinged at two of their adjacent ends and locked together at their other adjacent ends; and a harvester attachment carried by said semi-circular members, substantially as described.

5. In a device of the kind described, the combination of a wheeled frame; a motor driven shaft mounted in said frame; hollow bearings carried by said frame concentrically around said shaft; a pair of semi-circular members rotatably mounted on each of said bearings, the members of each pair thereof being hinged together at two of their adjacent ends; a screw extending through the other end of one member in each pair and threaded in the other member of such pair locking said members on their hollow bearing; and a harvester attachment carried by said semi-circular members, substantially as described.

In testimony whereof I have signed my name to this specification in the presence of two subscribing witnesses.

CHARLES F. RADATZ.

Witnesses:
JOSHUA R. H. POTTS,
ARTHUR A. OLSON.